United States Patent
Araki et al.

(10) Patent No.: US 11,281,691 B2
(45) Date of Patent: Mar. 22, 2022

(54) DATA REPLICATION BASED ON COMPRESSION RATIO HISTORY

(71) Applicant: International Business Machines Corporation, Armonk, NY (US)

(72) Inventors: Hiroshi Araki, Yokohama (JP); Shah Mohammad R. Islam, Tucson, AZ (US); Hiroyuki Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 14/960,557

(22) Filed: Dec. 7, 2015

(65) Prior Publication Data

US 2017/0161348 A1 Jun. 8, 2017

(51) Int. Cl.
*G06F 16/16* (2019.01)
*G06F 16/27* (2019.01)
(Continued)

(52) U.S. Cl.
CPC .......... *G06F 16/27* (2019.01); *G06F 11/1448* (2013.01); *G06F 11/1464* (2013.01); *G06F 16/951* (2019.01)

(58) Field of Classification Search
CPC .......... G06F 17/30575; G06F 11/1464; G06F 11/1446; G06F 17/30864; G06F 17/1446; G06F 17/30; G06F 11/1448; G06F 16/00
(Continued)

(56) References Cited

U.S. PATENT DOCUMENTS

| 7,664,763 B1 * | 2/2010 | Russell | H03M 7/30 707/802 |
| 7,719,443 B1 | 5/2010 | Natanzon | |

(Continued)

FOREIGN PATENT DOCUMENTS

| CN | 102469142 A | 5/2012 |
| CN | 104216662 A | 12/2014 |
| GB | 2533342 A | 6/2016 |

OTHER PUBLICATIONS

Patents Act 1977: Search Report under Section 17 dated May 5, 2017 for Application No. GB1620659.1, 4 pages.
(Continued)

*Primary Examiner* — Hosain T Alam
*Assistant Examiner* — Tracy M McGhee
(74) *Attorney, Agent, or Firm* — Stephen J. Walder, Jr.; Robert M. Sullivan

(57) ABSTRACT

Mechanisms are provided for performing a data replication operation to replicate data from a first data processing system to a second data processing system. The mechanisms store a compression ratio history in association with data to be replicated. The compression ratio history stores one or more compression ratios for one or more previously executed data replication operations. The mechanisms determine whether a data compression operation should be applied to the data for a current data replication operation based on the compression ratio(s) in the compression ratio history. In response to determining that data compression should be applied to the data, the data compression operation is performed and the compressed data is replicated to the second data processing system. In response to determining that data compression should not be applied, the data is replicated without compression.

17 Claims, 4 Drawing Sheets

(51) Int. Cl.
 *G06F 16/951* (2019.01)
 *G06F 11/14* (2006.01)
(58) Field of Classification Search
 USPC .......................................................... 707/620
 See application file for complete search history.

(56) References Cited

U.S. PATENT DOCUMENTS

| | | |
|---|---|---|
| 8,949,488 B2 | 2/2015 | Swift et al. |
| 2014/0237201 A1* | 8/2014 | Swift .................. H04L 67/1095 711/162 |
| 2015/0032696 A1* | 1/2015 | Camble ............... G06F 11/1456 707/634 |
| 2015/0112938 A1 | 4/2015 | Swift |

OTHER PUBLICATIONS

Japanese Office Action dated Jan. 10, 2020, Japanese Patent Application No. 201610985164.3, Translation unavailable. 6 pages.
Search Report for corresponding Japanese Patent Application No. 2016109851643 dated Dec. 31, 2019, 2 pages. Translation Unavailable.

\* cited by examiner

DATA REPLICATION BASED ON COMPRESSION RATIO HISTORY

BACKGROUND

The present application relates generally to an improved data processing apparatus and method and more specifically to mechanisms for performing efficient data replication based on compression ratio history.

Data replication is a common mechanism implemented in a number of storage products to avoid data loss due to program bugs, human errors, or catastrophic events. Normally, such data replication is done periodically, such as once a day. In such a case, a source system at a production site, and a target system at the data replication site, are normally physically distant from one another for dispersion of risk purposes. Data in the source system is transferred to the target system over one or more computer or data communication networks, such as Wide Area Networks (WANs), e.g., the Internet, and Local Area Networks (LANs).

In such replication over a computer or data communication network, data compression is also commonly used to reduce the size of data transferred over the network. This is because, in many cases, the network represents a bottleneck for the whole replication process and thus, it is beneficial to minimize the amount of data transfer over the network as much as possible and thereby increase the speed by which the replication process is performed.

One example of a data replication mechanism with compression is the "rsync" data replication tool which provides a compress option to compress the data transferred over the network. The rsync data replication tool uses "zlib", a Linux library for data compression. IBM SONAS and IBM Storwize V7000 Unified, available from International Business Machines (IBM) Corporation of Armonk, N.Y., use the rsync data replication tool as a data transfer engine for its data replication function.

SUMMARY

In one illustrative embodiment, a method is provided, in a first data processing system, for performing a data replication operation to replicate data from the first data processing system to a second data processing system. The method comprises storing, by the first data processing system, a compression ratio history in association with data to be replicated to the second data processing system. The compression ratio history stores at least one compression ratio for at least one previously executed data replication operation. The method further comprises determining, by the first data processing system, whether a data compression operation should be applied to the data for a current data replication operation based on the at least one compression ratio in the compression ratio history. The method also comprises, in response to determining that data compression should be applied to the data, performing, by the data processing system, the data compression operation on the data and performing the current data replication operation to replicate the compressed data to the second data processing system. In addition, the method comprises, in response to determining that data compression should not be applied to the data, performing, by the data processing system, the current data replication operation to replicate the data without compression to the second data processing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
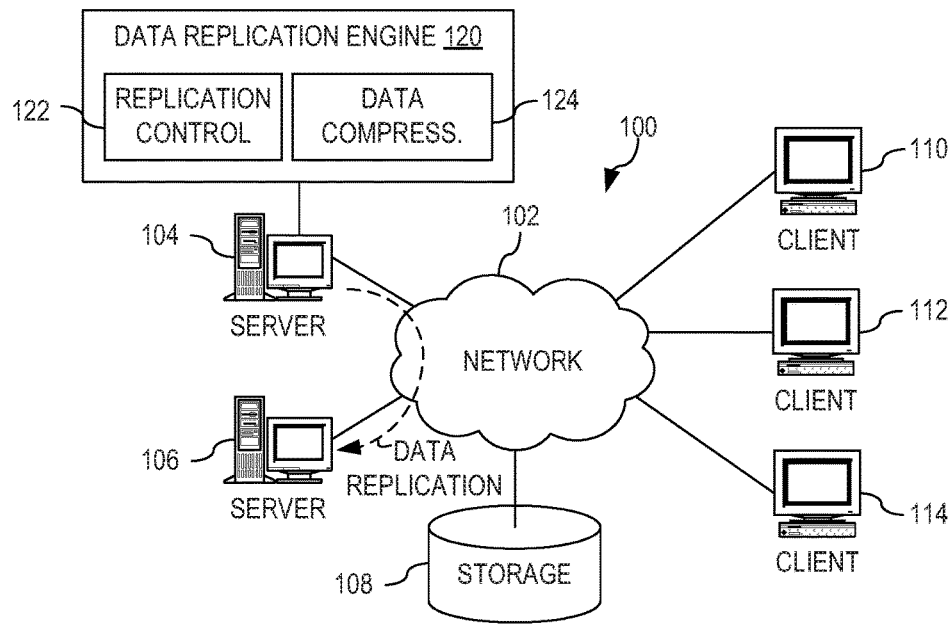
FIG. 1 is an example diagram of a distributed data processing system in which aspects of the illustrative embodiments may be implemented.

The illustrative embodiments provide mechanisms for performing efficient data replication based on compression ratio history. As noted above, data replication mechanisms that use data compression exist and are commonly used. However, in such systems that use data replication with data compression, even though data compression assists with the data replication process by minimizing the amount of data that needs to be transferred as well as the time to perform the data replication process, sometimes the data compression cannot compress the data well. For example, data that is already compressed, e.g., a xxx.gz or xxx.zip type file, or images/video files that are already encoded, are not compressed by very much in many cases, i.e. the file size is either not reduced or reduced only slightly. As a result, the cost of performing the data compression process in terms of time and resources, may outweigh the value obtained from the amount of compression achieved. Thus, as a result, sometimes a data replication with data compression may take longer to complete than a data replication without data compression if the sizes of the files are not appreciably affected by the data compression.

Thus, it would be beneficial to be able to determine when data compression during data replication will be beneficial to the data replication process and not result in a data replication process that takes longer than the data replication without data compression. However, it is difficult to know how much data can be compressed without compressing the data first because the compression ratio depends on the actual data pattern, i.e. the benefit of data compression cannot be determined a priori but can only be gauged by performing the data compression and seeing the amount of data size decrease obtained by performing the data compression.

The illustrative embodiments provide a data replication mechanism that is able to determine a priori whether data compression will improve the data replication process or not and apply data compression only for files that can be compressed well and result in an improvement in the data replication process by reducing the amount of data to be transferred over the data communication network and thus, improve the speed by which the data replication process is performed.

One option would be to have a listing of file types for which data compression should not be performed as part of the data replication process. For example, using an rsync data replication tool with a compress option, a listing of file extensions, such as .zip, .gz, .iso, .mp4, etc., may be provided and the file that is being replicated may have its extension compared to the list to determine if there is a match. If there is a match, then the data replication may be performed without performing data compression. If there is not a match, then data compression may be applied as part of the data replication process. While this works well, this technique is limited to effective operation with regard to files whose extensions are in the listing. That is, the effectiveness is limited by the comprehensiveness of the file extension listing. In other words, there may be files of different types that are not listed in the file extension list, and which do not result in appreciable data size reduction when data compression is applied. Moreover, there may be files that do not have a proper extension but are in fact a .zip, .gz, etc. type data file. In such a case, the data replication process with data compression will apply the data compression to the file since it does not include the proper extension even though the file is already compressed and will not result in an appreciable data size difference due to the application of the data compression as part of the data replication process, i.e. this will take additional time and resources with no significant beneficial result.

The illustrative embodiments utilize a mechanism based on the storage of a compression ratio history in association with the portion of data (considered to be a "file" herein for ease of explanation). As part of a data replication process, if a file is selected to be transferred with data compression, the file's corresponding compression ratio history is updated to include the compression ratio for the current data replication process, where the compression ratio is a ratio of the size of the compressed file to the size of the uncompressed file. The compression ratio history associated with a file is only updated when the file is actually subjected to data compression as part of the replication process. Thus, if it is determined that the file is to be replicated without compression, the file's associate compression ratio history is not updated.

The compression ratio history of a file may store one or more compression ratios determined for the file as part of a data compression process performed when performing the data replication process. Thus, in one illustrative embodiment, the compression ratio history may store only the latest compression ratio. In other illustrative embodiments, the compression ratio history may store n compression ratios $M(n)$ in a first-in-first-out (FIFO) manner, where $M(0)$ stores the most recent compression ratio of the last time the data replication of the file was performed using data compression and $M(n-1)$ has the oldest stored compression ratio for the file, n time ago. In some illustrative embodiments, the compression ratio itself may be an integer value between 1 and 100 that represents a percentage of data size reduction achieved by the data compression, e.g., 100 means the compression did not compress the data at all while 50 means that the data size of the file after data compression was half the size of the original data size of the file. Ratios may be rounded to the corresponding integer. As a result, each $M(i)$ value may be 1 byte and can be stored as an extended attribute of the file. For example if N is 1000, meaning that the last 1000 compression ratios of a file are stored in the compression ratio history, then the size of M is only 1 KB.

In determining whether to transfer a file using data compression or not as part of a data replication process, a process may compare a value obtained based on the compression ratio history to one or more threshold values to determine whether data compression is to be applied to the file. The data value obtained from the compression ratio history may be the latest compression ratio, an average of the compression ratios stored in the compression ratio history, or a function of one or more of the compression ratios stored in the compression ratio history. In some illustrative embodiments, if the compression ratio is less than a threshold value T, then performing the data replication operation with data compression is faster than performing the data replication operation without data compression, i.e. there is sufficient data compression that the cost of the data compression is outweighed by the reduction in data size and time required to perform the data replication process. If the compression ratio is equal to or greater than the threshold value T, then transfer without compression is faster than transfer with compression, i.e. there is no appreciable amount of data size reduction of the file achieved by applying data compression and thus, the added cost of data compression is not warranted.

The threshold value(s) may be determined in any desired manner including empirically by performing tests to determine the most appropriate setting of the threshold value(s). For example, a portion of data, e.g., 32 KB of data, may be provided that has a compression ratio of 1%, i.e. compressed very well, and another of 100%, i.e. not compressed very well, for a specific data compression algorithm that is to be used. Additional files may be generated for different levels of compression ratio as well. These files may be transferred using the data replication process with and without compression and the corresponding transfer times measured. A minimum compression ratio where transfer of the data without compression is faster than transfer with compression may be found and used to set the threshold value(s). Of course other approaches to finding the proper value(s) for the threshold(s) may be used without departing from the spirit and scope of the present invention.

In addition to the compression ratio history, a compression ratio check parameter is associated with the file and specifies a date/time at which the compression ratio of the file is to be checked. The date/time of the compression ratio check parameter specifies when the file must be transferred as part of a data replication process using data compression so that the compression ratio may be updated. That is, even if the mechanisms of the illustrative determine based on the compression ratio history that the file should not be transferred as part of the data replication process using compression (since no appreciable improvement in the replication process will be achieved due to no significant reduction in the size of the data), if the current date/time is equal to or after the date/time specified in the compression ratio check parameter, then the file is transferred as part of the data replication process using data compression. In this way, the compression ratio history will be updated with a more recent data compression ratio value which can be used to compare against the current threshold value(s) to determine if data replication with/without compression is appropriate.

Various mechanism may be implemented for storing the compression ratio check parameter, including setting a specific day/time as a future timestamp as a parameter associated with the file, setting a countdown timer or counter value that is incremented every unit of time, e.g., if the compression ratio check parameter is in terms of days, then the value in the compression ratio check parameter may be decremented every day until it reaches zero at which point the compression check operation mentioned above is performed. The compression ratio check parameter may be set to a default value such that all files have their compression ratios checked at a same amount of elapsed time since a last compression ratio check occurred. Alternatively, a maximum elapsed time for checking the compression ratio of a file may be set and individual compression ratio check parameters may be set within that maximum elapsed time based on compression characteristics of the file. That is, if the compression characteristics of the file indicate that the compression ratios vary significantly from one data compression process to the next, or over time, then the compression ratio check operation is performed more frequently than files whose compression ratios do not vary as significantly.

In some illustrative embodiments, a function $D(s)$ may be used to return the value to be stored as the compression ratio check parameter, e.g., number of days until the next compression check process is to be performed. That is, using days as the unit of time, the compression check process will be processed after the number of days specified by the $D(s)$ function elapses. The input to the $D(s)$ function may be a statistical measure or other function of the compression ratios in the compression ratio history $M(n)$. For example, the statistical measure or other function represents a measure of the stableness of the compression ratios over time. In one illustrative embodiment, this statistical measure or function may be the standard deviation s of M for a file at the time that the function $D(s)$ is being calculated. If the variation of the compression ratio values in M is very small, then the compression ratio is fairly constant and the compression check process does not need to be performed as often. On the other hand, if the compression ratio values in M vary greatly, then the compression ratio changes drastically and the compression check operation should be performed more frequently. For example, if one wants to check any file within the next 30 days at the longest, $D(s)$ can be defined as $D(s)=((50-s)/50)*30$. Using this function as an example, the compression ratio check parameter check_date may be set as check_date=$D(s)$+current_timestamp, for example.

Thus, in accordance with one illustrative embodiment, the mechanisms of the illustrative embodiment associate a compression ratio history $M(n)$ and compression ratio check parameter check_date with each file. The mechanisms of the illustrative embodiment further comprise elements for determining a first statistical measure, such as an average for example, of the compression ratios in the compression ratio history $M(n)$ for predicting the compression ratio of a next replication process. The mechanisms of the illustrative embodiments further comprise elements for calculating a second statistical measure of the compression ratios in the compression ratio history $M(n)$, such as a standard deviation of M for example, to determine how the compression ratios are distributed and provide information about the variability of the compression ratios across the last N number of replication processes. This second statistical measure is used to determine the frequency at which compression ratio checks are to be performed.

The mechanisms of the illustrative embodiment further comprise elements for establishing and utilizing one or more threshold value(s) T for determining when compression is to be used as part of the replication process. Moreover, the mechanisms of the illustrative embodiment comprise elements for applying a function $D(s)$ for determining how to set the compression ratio check parameter check_date of the file based on the second statistical measure of the compression ratios. The mechanisms of the illustrative embodiments further comprise elements for utilizing the above elements to facilitate dynamically determining for each file subject to a data replication process, whether data compression is to be used as part of the data replication process, primarily based on the compression ratio history and the determined frequency for checking the compression ratio of the file.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
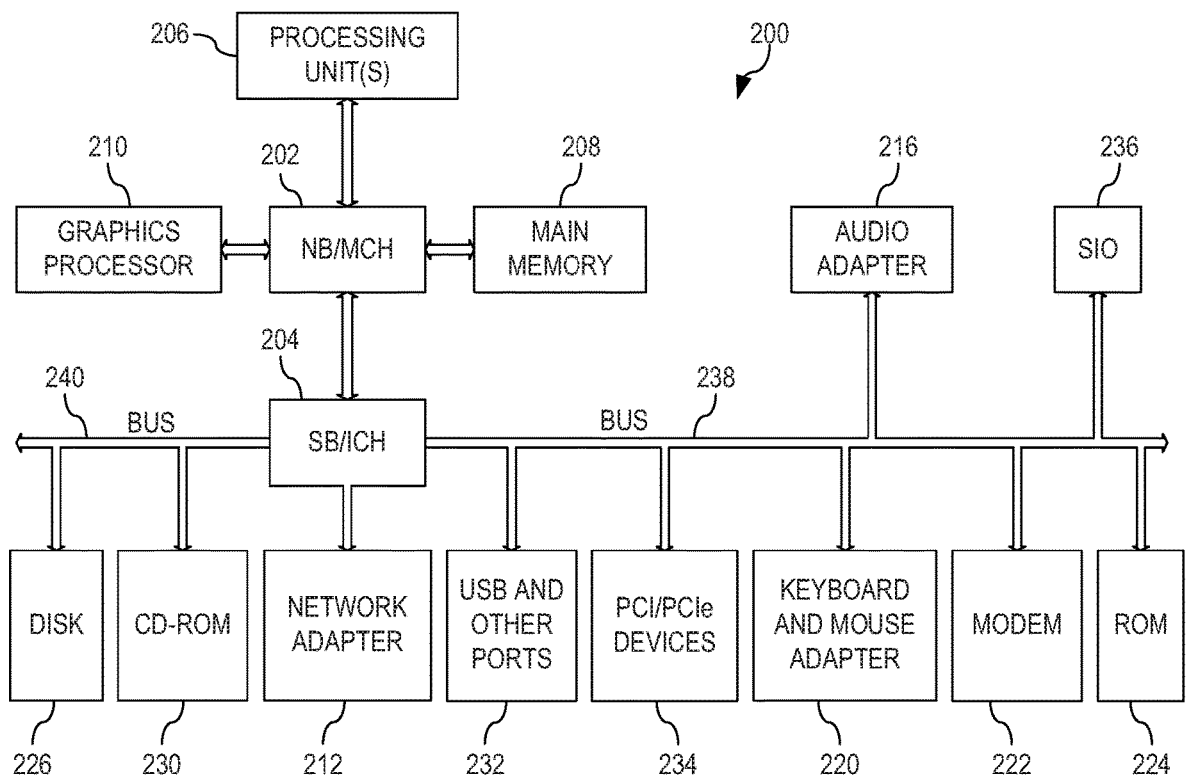
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In accordance with the illustrative embodiments, one or more of the computing devices shown in FIG. 1 may be configured to implement aspects of the illustrative embodiments, such as in the form of a data replication engine 120, for example. The data replication engine 120 comprises replication control logic 122 and data compression logic 124, among other elements not explicitly shown in FIG. 1. The replication control logic 122 comprises the logic for controller the data replication operations performed by the data replication engine 120 including determining, in accordance with the illustrative embodiments, when to perform data compression operations as part of the data replication operation. The data compression operation itself may be performed by the data compression logic 124 in accordance with one or more data compression algorithms and is further augmented to include logic for determining, for each file being replicated as part of the data replication operation, a compression ratio achieved by the data compression logic 124 and store that compression ratio information in a data compression ratio history associated with the file that was compressed. The replication control logic 124 may further comprise logic for determining a compression check parameter to be associated with a file that is subject to the data replication operation and associate the compression check parameter with the file as well as check the compression check parameter when determining whether to perform data compression of the file as part of the data replication operation.

Thus, for example, if a data replication operation is triggered on a server 104 (source computing device) for replicating data via the network 102 to a remotely located server 106 (target computing device), then the data replication engine 120 performs the data replication operation under the control of the replication control logic 122. As part of the control operations performed by the replication control logic 122, the replication control logic 122 reads the extended attributes and/or parameters associated with the file(s) to be replicated to server 106 and determines whether data compression is to be applied to the files being replicated based on the extended attributes and/or parameters. As mentioned above, the extended attributes and/or parameters comprise a compression ratio history M(n) where n is the number of data replication operations for which compression ratio information is maintained in the compression ratio history M, e.g., the last N number of replication operations. In so doing, the replication control logic 122 comprises logic for generating statistical measures of the compression ratios in the compression ratio history M(n) and then use those statistical measures to determine whether compression should be applied to the file(s) as part of the data replication engine 120 or not. In addition, the replication control logic 122 comprises logic to check the compression check parameter of the file(s) to determine if compression should be applied as part of the data replication operation regardless of whether the statistical measure of the compression ratio history M(n) indicates that compression should be applied or not. This ensures that the compression ratio history M(n) for those files that are determined to not benefit from compression as part of the replication process still have their compression ratio information updated periodically so that dynamic conditions that may affect whether to apply compression to the files during a subsequent data replication process are taken into consideration.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
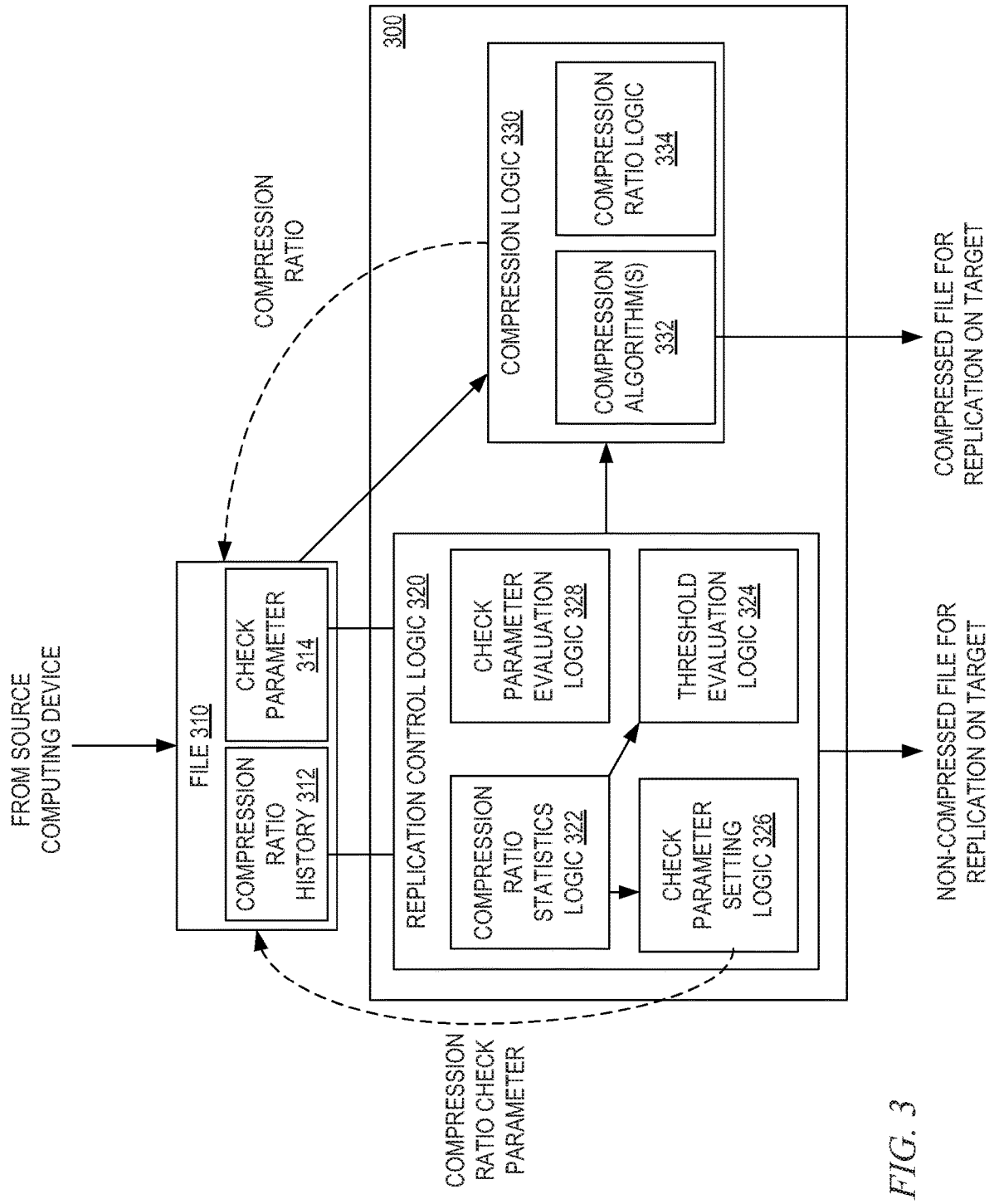
FIG. 3 is an example functional block diagram illustrating the primary operational elements for performing a data replication operation in accordance with one illustrative embodiment.

FIG. 3 is an example functional block diagram illustrating the primary operational elements for performing a data replication operation in accordance with one illustrative embodiment. The elements shown in FIG. 3 may be implemented in one or more of replication control logic 122 and data compression logic 124 of the data replication engine 120 in FIG. 1, for example. The elements in FIG. 3 may be implemented as specialized hardware units of a computing device, general purpose hardware units executing software instructions and thus, configured to perform the operations according to one or more of the illustrative embodiments, or any combination of specialized hardware units and general purpose hardware units executing software instructions. In one illustrative embodiment, it is assumed that the elements in FIG. 3 are implemented as software instructions/data loaded into memory and executed/processed by one or more processors of a computing device, such as being loaded into main memory 208 and executed by processing units 206 in FIG. 2.

As shown in FIG. 3, when a data replication operation or process is initiated, such as in response to an event, a user initiated request to perform data replication, or a schedule for data replication, a file 310, or other portion of data, that is a subject of the data replication is analyzed by the replication control logic 320 of the data replication engine 300. It should be appreciated that while a single file 310 is shown in FIG. 3, the data replication operation may be performed with a plurality of files or portions of data and the processes and operations described herein may be applied to each file or portion of data that is subject to a data replication operation.

The file 310 has associated with it, such as in the form of extended attributes or parameters of the file 310, a compression ratio history 312 and a compression ratio check parameter 314. The compression ratio history 312 stores N number of compression ratio values for the file 310 for the last N number of data replication operations in which data compression was utilized, i.e. a history of M(0) to M(N−1) compression ratio values. The compression ratio values may be stored in any suitable format. In one illustrative embodiment, the compression ratio values are stored as rounded integer values representing percentages of compression ratio, however the illustrative embodiments are not limited to such and any representation may be used without departing from the spirit and scope of the present invention.

The compression ratio check parameter 314 stores a date/time value for when a check of the compression ratio of the file 310 is to be performed irregardless of whether the replication control logic 320 determines based on the compression ratio history 312 that compression of the file 310 should be applied when performing the data replication operation. The compression ratio check parameter 314 may take many different forms depending upon the particular desired implementation but in general identifies a point in time, number of data replication operations, or other trigger criteria for checking the compression ratio of the associated file 310. In one illustrative embodiment, the compression ratio check parameter 314 specifies either a specific date and/or time, a number of data replication operations, an elapsed time, or the like when the next check of the compression ratio should take place. The value in the compression ratio check parameter 314 may be compared to a current date/time, may be counted down over instances of data replication operations or over time, or any other manner of determining if the trigger criteria specified in the compression ratio check parameter 314 is met and thus, a check of the compression ratio is initiated. In one illustrative embodiment, the compression ratio check parameter 314 is a timestamp of a future time when the compression ratio check is to be performed and the check parameter evaluation logic 328 compares this timestamp to a current timestamp and if the current timestamp equals or exceeds the compression ratio check parameter 314 timestamp, then the compression ratio check operation is initiated.

Thus, in accordance with one illustrative embodiment, two new attributes 312 and 314 are associated with the file 310 as summarized in the table below:

TABLE 1

New File Attributes for Controlling
Compression During Replication

| | |
|---|---|
| Compression Ratio History M(n) | First-in-First-Out (FIFO) that contains n compression ratios of the file. M(0) contains the compression ratio of the last time of replication and M(n − 1) has the oldest compression ratio of n replications ago. A compression ratio can be an integer between 1 and 100 that represents a percentage of data size reduction achieved by the data compression. Each M(i) is only 1 byte and if N is 1000, the total size of M is only 1 KB. This is small enough to be stored in an extended attribute of the file. |
| Compression Ratio Check Parameter check_date | Date/time for checking the associated file's compression ratio so that on or after this date/time the file will be transferred as part of the data replication operation with compression and the compression ratio updated in M(n) for the file. |

As shown in FIG. 3, the data replication engine 300 includes replication control logic 320 which in turn comprises compression ratio statistics logic 322, threshold evaluation logic 324, compression ratio check parameter setting logic 326, and compression ratio check parameter evaluation logic 328. The compression ratio statistics logic 322 generates statistical measures, or values, based on the compression ratios stored in the compression ratio history 312 of the file 310. The compression ratio statistics logic 322 may generate any suitable value for evaluation and use by the logic 324 and 236 for performing their operations of evaluating the values against a threshold and determining a suitable compression ratio check parameter value based on a determined variability of the compression ratios of the file 310. In one illustrative embodiment, the compression ratio statistics logic 322 generates an average of the compression ratios M(n) in the compression ratio history 312 and a standard deviation of the compression ratios in the compression ratio history 312. The average of the compression ratios is used to predict the compression ratio for a next data replication operation. The standard deviation of the compression ratios is used to know how the compression ratio for the file 310 is distributed and determine how to set the compression ratio check parameter 314 of the file 310. For example, if the standard deviation is close to 0, the compression ratios in the compression ratio history 312 have low variability (do not vary much) and thus, can be easily predicted. However, as the standard deviation value gets larger, the compression ratios are determined to vary more and become harder to predict. Thus, a lower value standard deviation is indicative of a less frequent need to check the compression ratio of the file 310 while a higher value standard deviation is indicative of a need to more frequently check the compression ratio of the file 310.

Thus, in accordance with one illustrative embodiment, the compression ratio statistics logic 322 generates two statistical values as shown in the table below:

TABLE 2

Statistical Measures Based on Compression Ratio History of File

| | |
|---|---|
| Average of M(n) | This value is used to predict the compression ratio for the next data replication. |
| Standard Deviation of M(n) | This value is used to determine how the compression ratio for the file is distributed. If this value is 0, the compression ratio for the file is assumed to not vary much and is generally predictable. As the value becomes larger, the compression ratio is more difficult to predict. |

The compression ratio statistics logic 322 provides the average of the compression ratios, i.e. average of M(n), to the threshold evaluation logic 324 which compares the average of the compression ratios to one or more thresholds T to determine whether data compression should be applied during the current data replication operation. For example, if the average compression ratio of the file 310, as determined from the compression ratios in the compression ratio history 312, is greater than or equal to a threshold T, then the file 310 should be replicated to the target computing system without compression since this is predicted to be faster than data replication with compression, i.e. data compression is predicted to not compress the file 310 significantly enough to offset the cost of the data compression operation in terms of time and resources needed to perform the data compression.

If the average of the compression ratios in the compression ratio history 312 is less than the threshold T, then data replication with compression is determined to be faster than data replication without compression. That is, it is determined that the benefits of data compression, i.e. reduction in data size, outweigh the additional cost of performing the data compression operation and thus, data compression should be applied. In such a case, the replication control logic 320 instructs the compression logic 330 to apply one or more compression algorithms 332 to the file 310 and output the compressed file for replication to the target computing system. In addition, the compression logic 330 comprises compression ratio logic 334 which calculates the compression ratio attained by performing the compression operation on the file 310 using the compression algorithm(s) 332. This compression ratio is then stored in the compression ratio history 312 associated with the file 310. As noted above, the compression ratio history 312 may be a FIFO type data structure where M(0) is the most recent compression ratio and thus, the compression ratio sent by the compression logic 330 is stored in this entry.

In the case that the threshold evaluation logic 324 determines that compression should not be applied to the file 310 as part of the data replication operation, the data replication engine 320 outputs the non-compressed file 310 for data replication to the target computing system unless the compression ratio check parameter indicates that compression should be applied regardless of the fact that the threshold evaluation logic 324 indicates that compression should not be applied. That is, in the case that the threshold evaluation logic 324 determines that the average compression ratio is greater than or equal to the threshold value T, an additional check of the compression ratio check parameter is performed by the compression ratio check parameter evaluation logic 328 to determine if the compression ratio check is to be triggered. If the criteria of the compression ratio check parameter 314 is met, then even though the threshold evaluation logic 324 indicates that compression should not be applied, the replication control logic 320 outputs a command to the compression logic 330 to perform the data compression operation on the file 310 using the compression algorithm(s) 332 with the resulting compression ratio calculation by the compression ratio logic 334 and update of the compression ratio history 312.

As mentioned above, in one illustrative embodiment, this check of the trigger criteria of the compression ratio check parameter 314 may comprise comparing a timestamp specified in the compression ratio check parameter 314 to the current timestamp to determine if the current timestamp is equal to or later than the timestamp of the compression ratio check parameter 314. If so, then the compression ratio check operation should be initiated. If not, then the compression ratio check operation is not initiated. When the compression ratio check operation is initiated, an update of the compression ratio check parameter 314 is also performed by the check parameter setting logic 326. The check parameter setting logic 326 receives the variability statistic from the compression ratio statistics logic 322, e.g., the standard deviation measure of the compression ratios in the compression ratio history 312, and determines a setting for the compression ratio check parameter 314. This setting may be based on the current timestamp, e.g., adding a certain amount of time to the current timestamp to generate a timestamp for a future date/time when the compression ratio check operation should be triggered again.

As mentioned above, in one illustrative embodiment, the check parameter setting logic 326 may utilize a function D(s) that returns a number of days that the compression ratio check will not get executed, i.e. a number of days until the next check of the compression ratio. The input to this function is the standard deviation s of the compression ratio history M(n) 312 for the file 310. If the variation of the compression ratios in M(n) is very small, it is assumed that the compression ratio is fairly constant and the compression ratio check operation does not need to be initiated frequently. On the other hand, if the compression ratios in M(n) are determined to vary greatly, it is assumed that the compression ratio may change drastically and thus, the compression ratio check operation should be initiated more frequently. A maximum amount of time, or number of data replication operations, or the like, may be set for the compression ratio check operation and the function D(s) may accommodate this maximum value. For example, in one implementation if the file 310 is to be checked within the next 30 days (i.e. 30 days is the maximum amount of time), then D(s) may be defined as $D(s)=((50-s)/50)*30$. Using this function D(s), the compression ratio check parameter 314 check_date may be filled by setting check_date=D(s)+ current timestamp. This check_date may be stored in association with the file 310 as the compression check parameter 314.

Thus, the mechanisms of the illustrative embodiments allow for dynamic determination of whether to apply data compression to a file or portion of data based on a history of compression ratios achieved for the file or portion of data in past data replication operations. As a result, instances where data compression does not appreciably improve the data replication operation may be identified and data compression may be avoided. Thus, each data replication operation is performed in the best possible time with the optimum use of resources.

To further illustrate the operation of the illustrative embodiments, consider the following example set of files and corresponding compression ratio history values, statistics, and compression ratio check parameters:

TABLE 3

Example of File Compression Ratio Histories, Statistics, and Check Values

| File | M(0) | M(1) | M(2) | M(3) | M(4) | Average | Standard Deviation | D(s) |
|---|---|---|---|---|---|---|---|---|
| File 1 | 30% | 32% | 24% | 42% | 42% | 34% | 7.04 | 25.77 |
| File 2 | 10% | 74% | 65% | 8% | 13% | 34% | 29.17 | 12.50 |
| File 3 | 34% | 34% | 34% | 34% | 34% | 34% | 0 | 30 |
| File 4 | 100% | 100% | 1% | 1% | 1% | 40.6% | 48.5 (48.499 . . .) | 0.9 |

This example uses the D(s) function described above and assumes a range of compression ratios from 0% to 100% where 0% represents an optimally compressed file and 100% represents no compression achieved. A threshold value T of 40% is assumed for purposes of this example. As shown in Table 3, based on the comparison to the threshold T, only File 4 is determined to be one that should be sent without compression since its average compression ratio is equal to or greater than T. However, the compression ratio check operation for file 4 is checked after every 0 days, i.e. each day, and thus, is checked at the next data replication operation. This is because the standard deviation of the compression ratios M(0)-M(4) of file 4 is quite large. While the other files will have compression applied when they are the subject of a data replication operation, due to their average compression ratios being below the threshold T, they will have their compression ratios checked at various times based on the variability of their compression ratios as indicated by the standard deviation. For example, file 1 will have its compression ratio checked after 25 days, file 2 will have its compression ratio checked after 12 days, and file 3 will have its compression ratio checked after 30 days.

The difference in check times is based on the variability of the compression ratios where it can be seen that the variability of file 3 is very small and thus, the check does not need to be performed very often but is limited by the maximum value of 30 days noted above. The variability of the compression ratio for file 2 is much larger than file 3 and thus, the check operation is performed more often. The variability of file 1 is greater than that of file 3 but is less than that of file 2 and thus, the check operation is performed less often than file 2, but more often than file 3.

Thus, in accordance with one illustrative embodiment, the mechanisms of the illustrative embodiment associate a compression ratio history M(n) and compression ratio check parameter check_date with each file. The mechanisms of the illustrative embodiment further comprise elements for determining a first statistical measure, such as an average for example, of the compression ratios in the compression ratio history M(n) for predicting the compression ratio of a next replication process. The mechanisms of the illustrative embodiments further comprise elements for calculating a second statistical measure of the compression ratios in the compression ratio history M(n), such as a standard deviation of M for example, to determine how the compression ratios are distributed and provide information about the variability of the compression ratios across the last N number of replication processes. This second statistical measure is used to determine the frequency at which compression ratio checks are to be performed.

The mechanisms of the illustrative embodiment further comprise elements for establishing and utilizing one or more threshold value(s) T for determining when compression is to be used as part of the replication process. Moreover, the mechanisms of the illustrative embodiment comprise elements for applying a function, e.g., the function D(s) above, for determining how to set the compression ratio check parameter, e.g., check_date parameter, of the file based on the second statistical measure of the compression ratios. The mechanisms of the illustrative embodiments further comprise elements for utilizing the above elements to facilitate dynamically determining for each file subject to a data replication process, whether data compression is to be used as part of the data replication process, primarily based on the compression ratio history and the determined frequency for checking the compression ratio of the file. Thus, in a single data replication operation, some of the files may be compressed while others are not depending on the decisions made by the data replication engine for each of the files individually.

Figure 4:
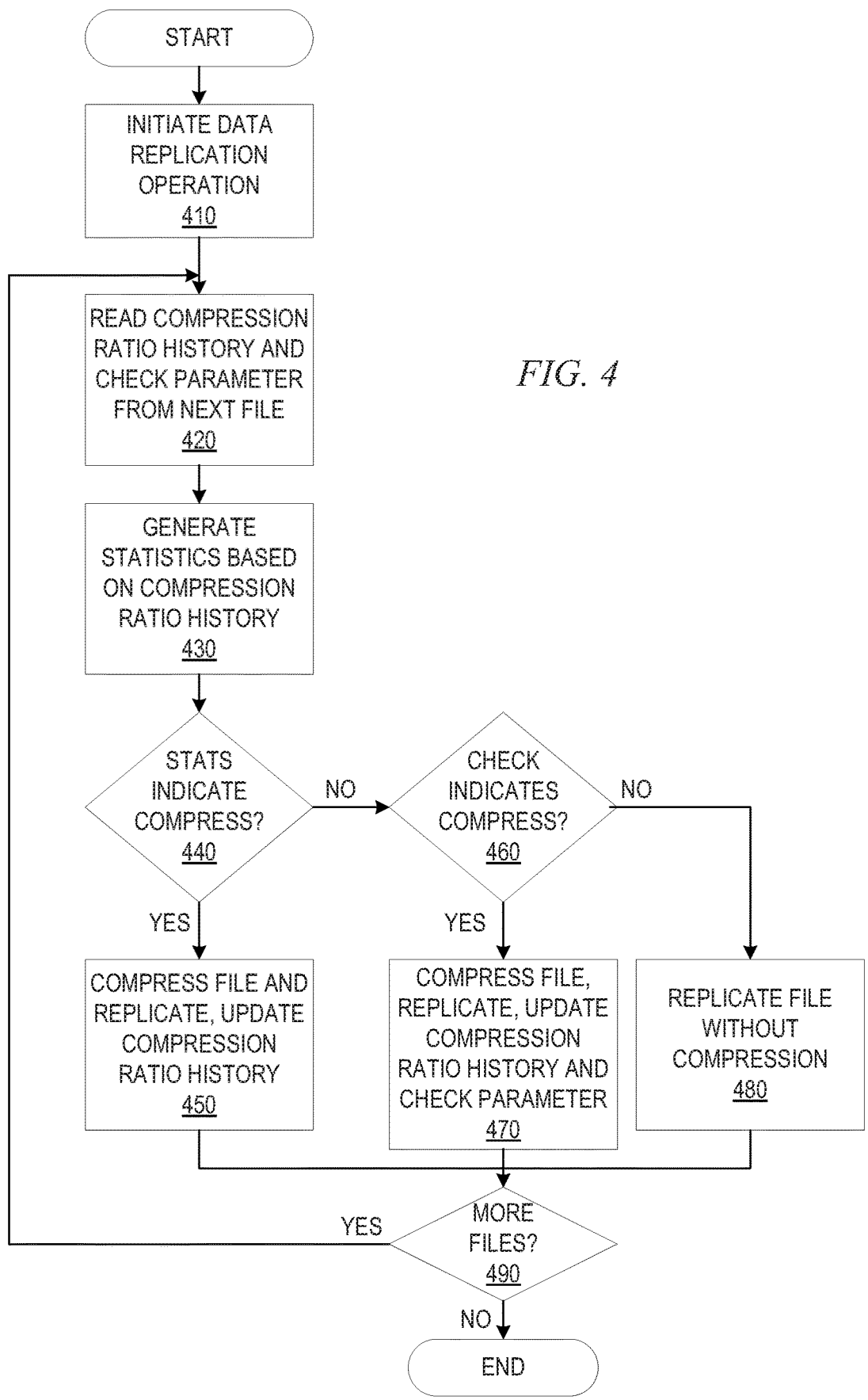
FIG. 4 is a flowchart outlining an example operation for performing data replication in accordance with one illustrative embodiment.

FIG. 4 is a flowchart outlining an example operation for performing data replication in accordance with one illustrative embodiment. The operation outlined in FIG. 4 may be implemented, for example, by the logic of a data replication engine in accordance with one illustrative embodiment.

As shown in FIG. 4, the operation starts by initiating a data replication operation (step 410). As noted above, this initiation of the data replication operation may be performed in response to the detection of an event, a user initiated request to perform data replication, a scheduled data replication event, or the like. In response to the data replication operation being initiated, the compression ratio history and compression ratio check parameter for the next file in the data replication operation is read (step 420) and statistics are generated based on the compression ratio history (step 430). A determination is made as to whether the statistics indicate that data compression should be applied to the file as part of the data replication operation (step 440). As mentioned above, in one illustrative embodiment, this may involve comparing a statistic of the compression ratio history of the file to one or more threshold values. If the statistics indicate that compression should be applied, then the file is compressed and replicated to the target computing device and the compression ratio history for the file is updated (step 450).

If the statistics do not indicate that data compressions should be applied, then a determination is made as to whether the compression ratio check parameter indicates that compression should be applied (step 460). As mentioned above, this may involve evaluating a compression ratio check parameter to see if a trigger condition of the compression ratio check parameter is met or not, e.g., a current time is after a timestamp of the compression ratio check parameter. If so, then the file is compressed and replicated to the target computing system and the compression ratio history of the file and compression ratio check parameter are updated accordingly (step 470). If not, then the file is replicated to the target computing system without compression being applied (step 480).

Thereafter, a determination is made as to whether there are more files to be processed as part of the data replication operation. If so, then the operation returns to step 420 where the process is repeated for the next file in the data replication operation (step 490). If there are no further files, the operation terminates.

Figure 5:
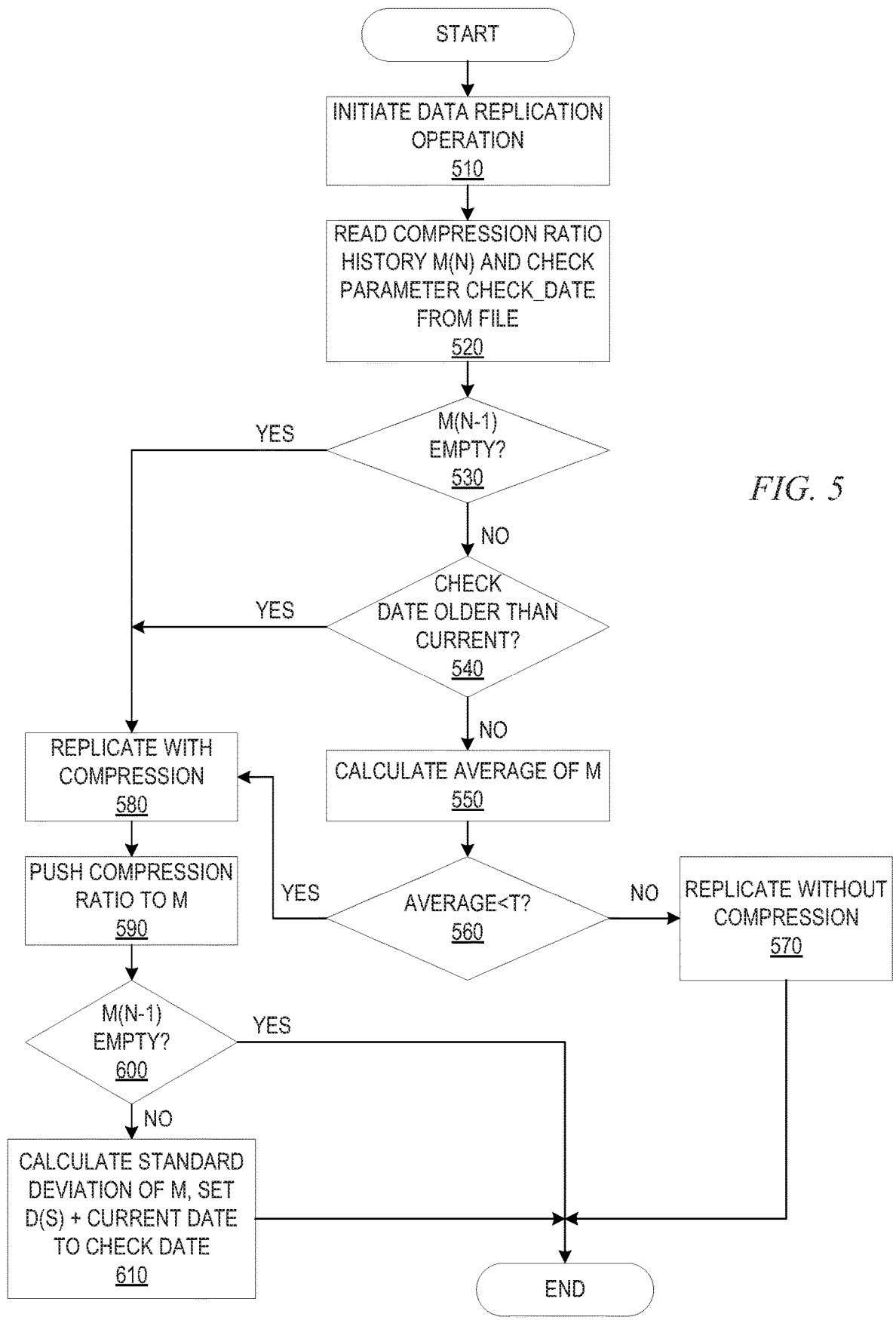
FIG. 5 is a flowchart outlining an example operation for performing a data replication operation for a single file in accordance with another illustrative embodiment.

FIG. 5 is a flowchart outlining an example operation for performing a data replication operation for a single file in accordance with another illustrative embodiment. Again, the operation shown in FIG. 5 may be implemented by logic of a data replication engine and utilizes the particular threshold T, check_date parameter, compression ratio history M(n), and function D(s) for setting the check_date parameter as described previously.

As shown in FIG. 5, the operation again starts with the initiation of a data replication operation (step 510) followed by the reading of a compression ratio history M(n) and compression ratio check date parameter check_date from the file (step 520). A determination is made as to whether the oldest entry in the compression ratio history M(n) is empty or not (step 530). If this entry is empty, then compression is applied to the file (step 580). This essentially ensures that the compression ratio history is filled prior to determining to not use compression during a data replication operation. In this way, a full history of compression ratios is provided for subsequent determinations to provide full information upon which to determine whether to apply data compression or not.

If the last entry M(n−1) in the compression ratio history is not empty, then a check is made as to whether the check_date is older than the current date (step 540). If so, then compression is applied to the file (step 580). If the check_date is not older than the current date, then the average of the compression ratios in the compression ratio history is calculated (step 550). If the average is equal to or greater than the threshold T, then the replication of the file is performed without compression (step 570). If the average is less than an established threshold T (step 560), then replication with data compression of the file is performed (step 580). Thereafter, if compression is applied either because M(n−1) is empty, the check_date is older than the current date, or the average of the compression ratios is less than the threshold T, the compression ratio achieved by applying data compression to the file is pushed onto the compression ratio history (step 590). A determination is then made as to whether the last entry in the compression ratio history is empty or not (step 600). If it is empty, the operation terminates. If it is not empty, then the standard deviation s of the compression ratios is calculated and the check_date parameter is set to the sum of the function D(s) and the current date (step 610).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a first data processing system, for performing a data replication operation to replicate data from the first data processing system to a second data processing system, the method comprising:
    storing, by the first data processing system, a compression ratio history for data to be replicated to the second data processing system, wherein the compression ratio history stores at least one compression ratio for a last N number of data replication operations in which data compression was utilized, wherein the compression ratio is a ratio of a size of compressed data to a size of uncompressed data;
    determining, by the first data processing system, whether a data compression operation should be applied to the data for a currently executing data replication operation based on the at least one compression ratio in the compression ratio history;
    in response to determining that data compression operation should be applied to the data based on the at least one compression ratio in the compression ratio history, performing, by the first data processing system, the data compression operation on the data thereby forming compressed data and performing, by the first data processing system, the currently executing data replication operation to replicate the compressed data to the second data processing system;
    in response to determining that data compression operation should not be applied to the data based on the at least one compression ratio in the compression ratio history, identifying, by the first data processing system, a stored compression ratio check parameter that specifies a date and/or time at which a compression ratio for the data is to be checked;
    in response to the stored compression ratio check parameter indicating a date and/or time prior to a current date and/or current time:
        determining, by the first data processing system, that the data compression operation should be applied to the data for the currently executing data replication operation; and
        performing, by the first data processing system, the data compression operation on the data thereby forming compressed data and performing, by the first data processing system, the currently executing data replication operation to replicate the compressed data to the second data processing system; and
    in response to the compression ratio check parameter indicating a date and/or time after the current date and/or current time, performing, by the first data processing system, the currently executing data replication operation to replicate the data without compression to the second data processing system.

2. The method of claim 1, further comprising, in response to determining that data compression operation should be applied to the data:
    calculating a current compression ratio for the data compression operation; and
    updating the compression ratio history based on the current compression ratio.

3. The method of claim 1, wherein the compression ratio history stores only a recent compression ratio for the data for a recent data replication operation in which data compression is utilized.

4. The method of claim 1, wherein the compression ratio history stores a plurality of compression ratios for the data generated based on a plurality of data compression operations on the data as part of a plurality of data replication operations.

5. The method of claim 1, wherein the data is a file and wherein the compression ratio history is stored as an extended attribute of the file.

6. The method of claim 5, wherein the extended attribute of the file comprises a plurality of integer values, each integer value being associated with a data replication operation and representing a compression ratio for the data replication operation.

7. The method of claim 1, wherein determining whether the data compression operation should be applied to the data for the currently executing data replication operation comprises comparing the at least one compression ratio to a threshold value, and wherein it is determined that the data compression operation should be applied in response to the at least one compression ratio being greater than or equal to the threshold value.

8. The method of claim 1, wherein determining whether the data compression operation should be applied to the data for the currently executing data replication operation comprises:
    calculating a value based on the at least one compression ratio;
    comparing the value to a threshold value; and
    determining that the data compression operation should be applied to the data for the currently executing data replication operation in response to the value being greater than or equal with the threshold value.

9. A computer program product comprising a computer readable storage medium having a computer readable program stored therein, wherein the computer readable program, when executed on a computing device, causes the computing device to:
store a compression ratio history for data to be replicated to a data processing system, wherein the compression ratio history stores at least One compression ratio for a last N number of data replication operations in which data compression was utilized, wherein the compression ratio is a ratio of a size of compressed data to a size of uncompressed data;
determine whether a data compression operation should be applied to the data for a currently executing data replication operation based on the at least one compression ratio in the compression ratio history;
in response to determining that data compression operation should be applied to the data based on the at least one compression ratio in the compression ratio history, perform the data compression operation on the data thereby forming compressed data and perform the currently executing data replication operation to replicate the compressed data to the data processing system;
in response to determining that data compression operation should not be applied to the data based on the at least one compression ratio in the compression ratio history, identify a stored compression ratio check parameter that specifies a date and/or time at which a compression ratio for the data is to be checked;
in response to the stored compression ratio check parameter indicating a date and/or time prior to a current date and/or current time:
determine that the data compression operation should be applied to the data for the currently executing data replication operation; and
perform the data compression operation on the data thereby forming compressed data and perform the currently executing data replication operation to replicate the compressed data to the second data processing system; and
in response to the compression ratio check parameter indicating a date and/or time after the current date and/or current time, perform the currently executing data replication operation to replicate the data without compression to the data processing system.

10. The computer program product of claim 9, further comprising, in response to determining that data compression operation should be applied to the data:
calculating a current compression ratio for the data compression operation; and
updating the compression ratio history based on the current compression ratio.

11. The computer program product of claim 9, wherein the compression ratio history stores only a recent compression ratio for the data for a recent data replication operation.

12. The computer program product of claim 9, wherein the compression ratio history stores a plurality of compression ratios for the data generated based on a plurality of data compression operations on the data as part of a plurality of data replication operations.

13. The computer program product of claim 9, wherein the data is a file and wherein the compression ratio history is stored as an extended attribute of the file.

14. The computer program product of claim 13, wherein the extended attribute of the file comprises a plurality of integer values, each integer value being associated with a data replication operation and representing a compression ratio for the data replication operation.

15. The computer program product of claim 9, wherein determining whether the data compression operation should be applied to the data for the currently executing data replication operation comprises comparing the at least one compression ratio to a threshold value, and wherein it is determined that the data compression operation should be applied in response to the at least one compression ratio greater than or equal to the threshold value.

16. The computer program product of claim 9, wherein determining whether the data compression operation should be applied to the data for the currently executing data replication operation comprises:
calculating a value based on the at least one compression ratio;
comparing the value to a threshold value; and
determining that the data compression operation should be applied to the data for the currently executing data replication operation in response to the value being greater than or equal with the threshold value.

17. An apparatus comprising:
a processor; and
a memory coupled to the processor, wherein the memory comprises instructions which, when executed by the processor, cause the processor to:
store a compression ratio history for data to be replicated to a data processing system, wherein the compression ratio history stores at least one compression ratio for a last N number of data replication operations in which data compression was utilized, wherein the compression ratio is a ratio of a size of compressed data to a size of uncompressed data;
determine whether a data compression operation should be applied to the data for a currently executing data replication operation based on the at least one compression ratio in the compression ratio history;
in response to determining that data compression operation should be applied to the data based on the at least one compression ratio in the compression ratio history, perform the data compression operation on the data thereby forming compressed data and perform the currently executing data replication operation to replicate the compressed data to the data processing system;
in response to determining that data compression operation should not be applied to the data based on the at least one compression ratio in the compression ratio history, identify a stored compression ratio check parameter that specifies a date and/or time at which a compression ratio for the data is to be checked;
in response to the stored compression ratio check parameter indicating a date and/or time prior to a current date and/or current time:
determine that the data compression operation should be applied to the data for the currently executing data replication operation; and
perform the data compression operation on the data thereby forming compressed data and perform the currently executing data replication operation to replicate the compressed data to the second data processing system; and
in response to the compression ratio check parameter indicating a date and/or time after the current date and/or current time, perform the currently executing data replication operation to replicate the data without compression to the data processing system.

* * * * *